Oct. 8, 1963  A. H. DALL  3,106,046
CONTOUR TRACING APPARATUS
Filed June 14, 1962  5 Sheets-Sheet 1

INVENTOR.
ALBERT H. DALL
BY
Howard Keiser
& John F. Verhoeven
ATTORNEYS

Oct. 8, 1963

A. H. DALL 3,106,046

CONTOUR TRACING APPARATUS

Filed June 14, 1962

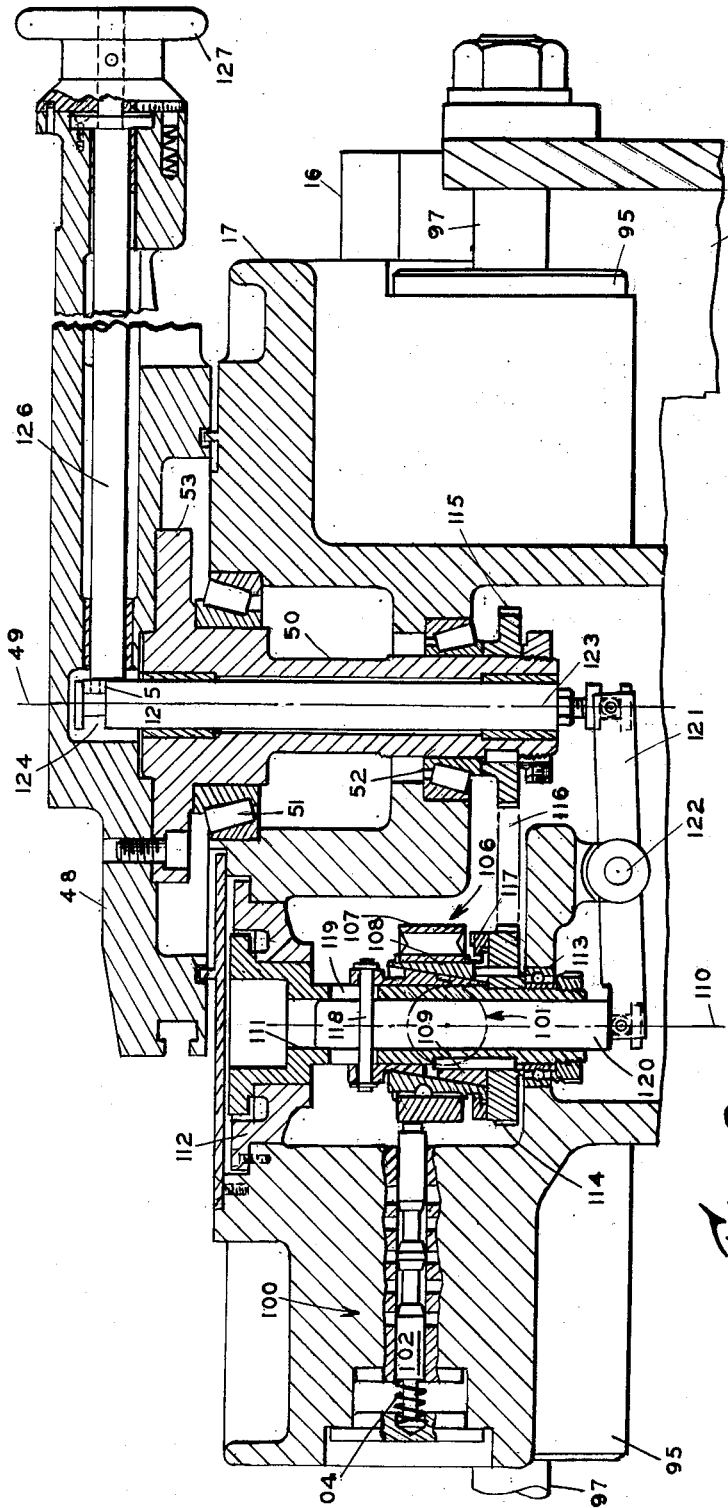

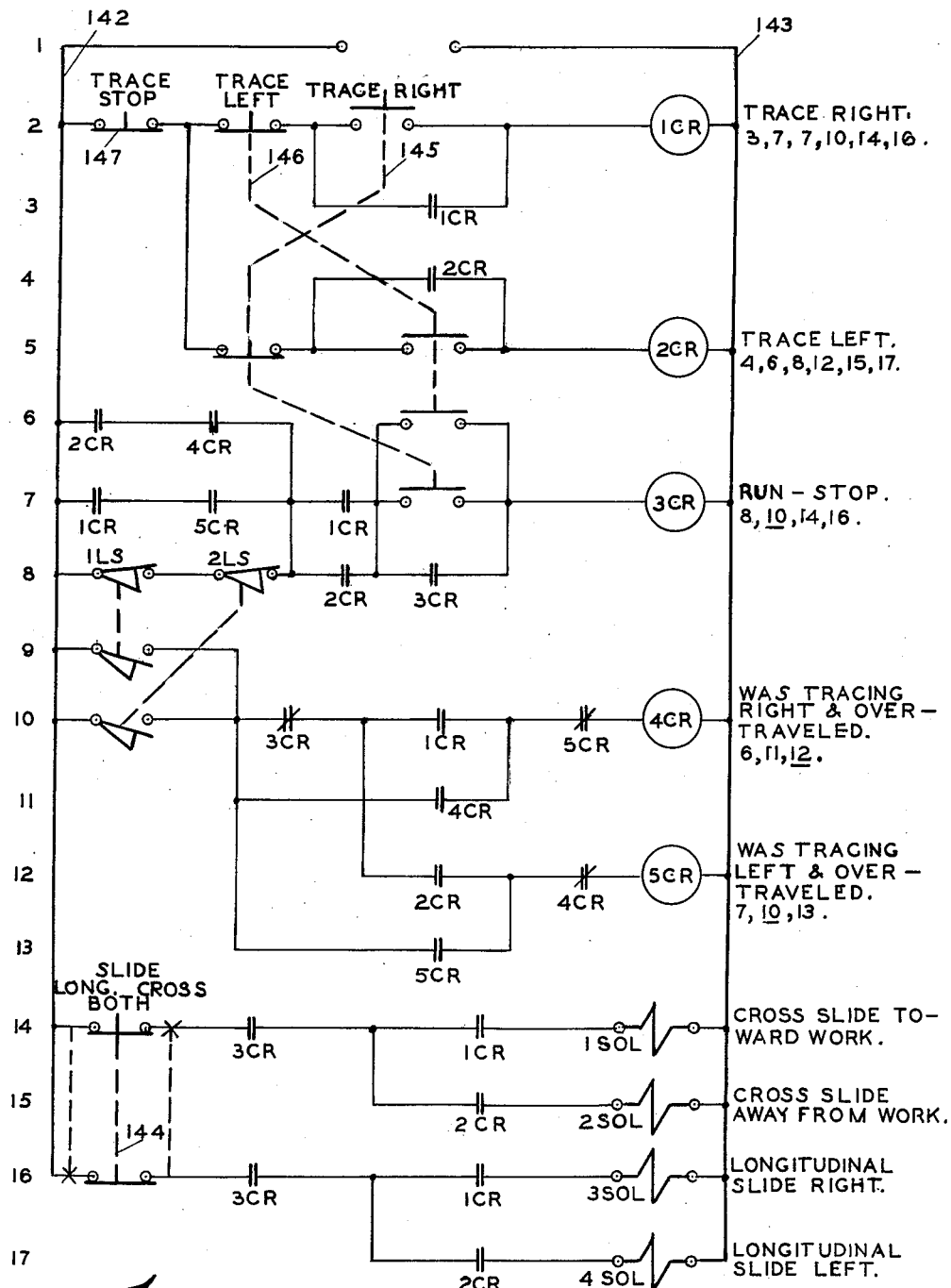

United States Patent Office 3,106,046
Patented Oct. 8, 1963

3,106,046
CONTOUR TRACING APPARATUS
Albert H. Dall, Cincinnati, Ohio, assignor to The Cincinnati Milling Machine Co., Cincinnati, Ohio, a corporation of Ohio
Filed June 14, 1962, Ser. No. 202,474
10 Claims. (Cl. 51—100)

This invention relates to a machine for accurately following the outline of a template and, more particularly, to a machine for reproducing in a workpiece the exact contour of a template or master.

Prior to the present invention, machines have been known for tracing the outline of a template or master and for reproducing the shape of the template in a workpiece. One such machine is disclosed in U.S. Patent No. 2,419,529 granted April 29, 1947 to Oscar M. Braaten and entitled Contour Cutter Grinder, and U.S. Patent No. 2,425,859 granted August 19, 1947 for Cutter Grinder. The machine disclosed in these patents is designed especially for the sharpening of contour cutters and is provided with a swivel support for the sharpening tool so that the tool can at all times be maintained perpendicular to the contour of the cutter thereby insuring that the clearance angle will be uniform over the entire length of a cutter tooth.

The swivel support for the sharpening tool is mounted on a pair of transversely movable slides so as to permit universal or 360 degree movement of the tool and of a follower pin mounted for movement therewith. Thereby, the follower may be moved along a template and the tool will follow an identical path with respect to the cutter. In this machine, however, it is necessary for the operator to manually move the slides so as to keep the pin in contact with the template while the tool is moved along the cutter. Even though the slides are mounted on ball-bearing ways for reducing the resistance of the slides to movement by the operator, the inertia of the slides and of the swivel support thereon is sufficiently great as to render it impossible for the operator to maintain uniform pressure between the follower and the template. Hence, as a result of deflections of the machine structure caused by the pressures involved, the accuracy of reproduction with this arrangement is not as great as might be expected.

To eliminate this source of inaccuracy in the machine and also to provide a contour following apparatus which is more sensitive to manipulation by the operator, a machine has been created in which the slides are moved by power in the proper direction and at the proper velocity to move the follower along the template at a uniform rate. Accordingly, all the operator need do is to maintain the sharpening tool perpendicular to the contour of the cutter and to press the follower against the template. The follower and the tool are mounted on a ball slide so as to permit the operator to always maintain the follower in contact with the template. Since this is the only element which must be moved by the operator, the inertia of the manually operable parts is greatly reduced and the sensitivity of the mechanism is much improved. Therefore, the operator can maintain a uniform, light pressure of the follower against the template and very accurate reproductions can be obtained.

Hence, it is an object of the present invention to provide a contour tracing apparatus which is so constructed as to enable the operator to follow the outline of a template with a high degree of precision.

Another object of the invention is to provide in a contour reproducing apparatus of the type having a pair of transversely movable supporting slides, a power drive for the slides controlled by the swiveling of the tool head to thereby cause the tool to be moved by power along a path defined by a template.

Another object of the invention is to provide a contour reproducing apparatus of the type described in the preceding object with a compensating slide for supporting the tool head on the swivel for limited movement toward or away from the template.

Another object of the invention is to provide means to stop the power drive to the slides whenever movement of the compensating slide exceeds a predetermined limit.

With these and other objects in view which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 3 is a cross-sectional elevation taken along the line 3—3 in FIG. 1 but with the wheelhead swiveled 90° from the position shown in FIG. 1.

FIG. 6 is a wiring diagram showing the electrical control circuit of the machine herein illustrated.

Figure 1:
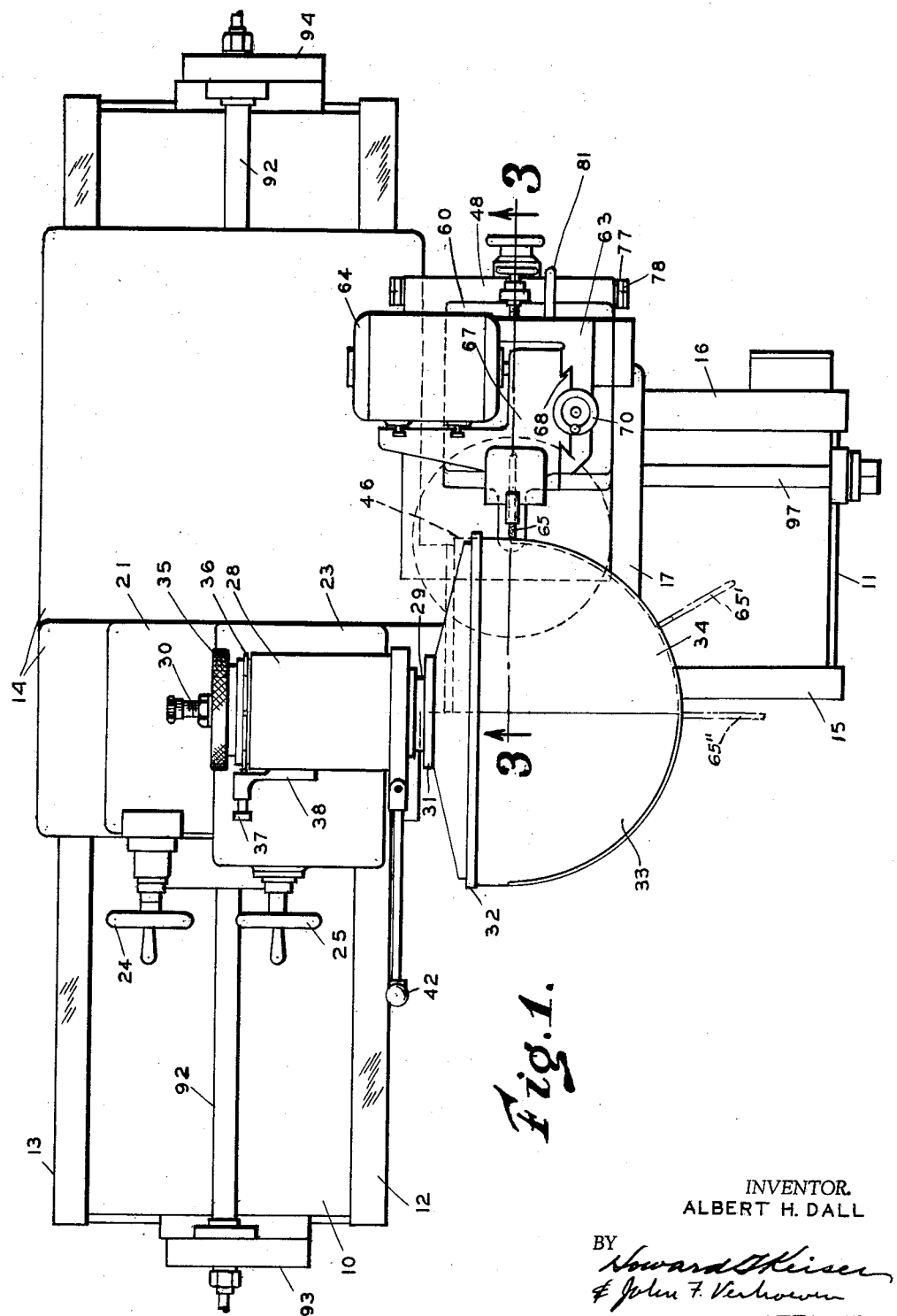
FIG. 1 is a plan view of a contour cutter sharpening machine to which the present invention has been shown applied for purposes of illustration.

In the description which follows, the invention will be described in connection with a contour cutter sharpening machine which has been chosen to illustrate the construction and mode of operation thereof. It will be realized, of course, that such machine represents but one possible form or embodiment of apparatus to which the invention might be applied and that many other arrangements might be utilized with equally beneficial results.

The cutter sharpening machine shown in the accompanying drawings incuudes a bed 10 (FIGS. 1 and 2) which provides support for the operative elements of the machine. The bed is provided with a pair of longitudinally extending ways 12 and 13 on which a longitudinal slide 14 is mounted for sliding movement. The bed is also provided with a forwardly extending portion 11 having a pair of horizontal ways 15 and 16 on which a cross slide 17 is mounted for sliding movement in a direction perpendicular to that of the slide 14.

The longitudinal slide 14 carries a dovetail guide 20 (FIG. 2) which supports a saddle 21 thereon for movement at right angles to the direction of travel of the slide. The saddle 21 is in turn provided on its upper surface with ways 22 for guiding an auxiliary slide 23 for movement in a longitudinal direction on the saddle 21. Transverse movement of the saddle 21 on the slide 14 is effected by means of a handwheel 24 while longitudinal movement of the auxiliary slide 23 on the saddle 21 is effected by means of a handwheel 25.

Secured to the slide 23 is a workhead 28 in which is journaled a spindle 29. The spindle is similar to a machine tool spindle in that it is hollow and is provided with a drawbolt 30 for securing a tapered arbor 31 in the spindle. In the present instance, the arbor 31 has attached thereto a face plate 32 to which is secured the blades 33 and 34 of the cutter to be sharpened.

The spindle 29 is adapted to be rotated manually by means of a knurled handwheel 35 secured to the rear end of the spindle. It may also be found desirable to provide means for locating the spindle in predetermined angular positions and for this purpose a notched index plate 36 is attached to the spindle and to the handwheel 35 for rotation therewith. An index plunger 37 supported on a bracket 38 is adapted to engage with the notches of the index plate and hold the spindle against the rotation in a preselected angular position.

Figure 2:
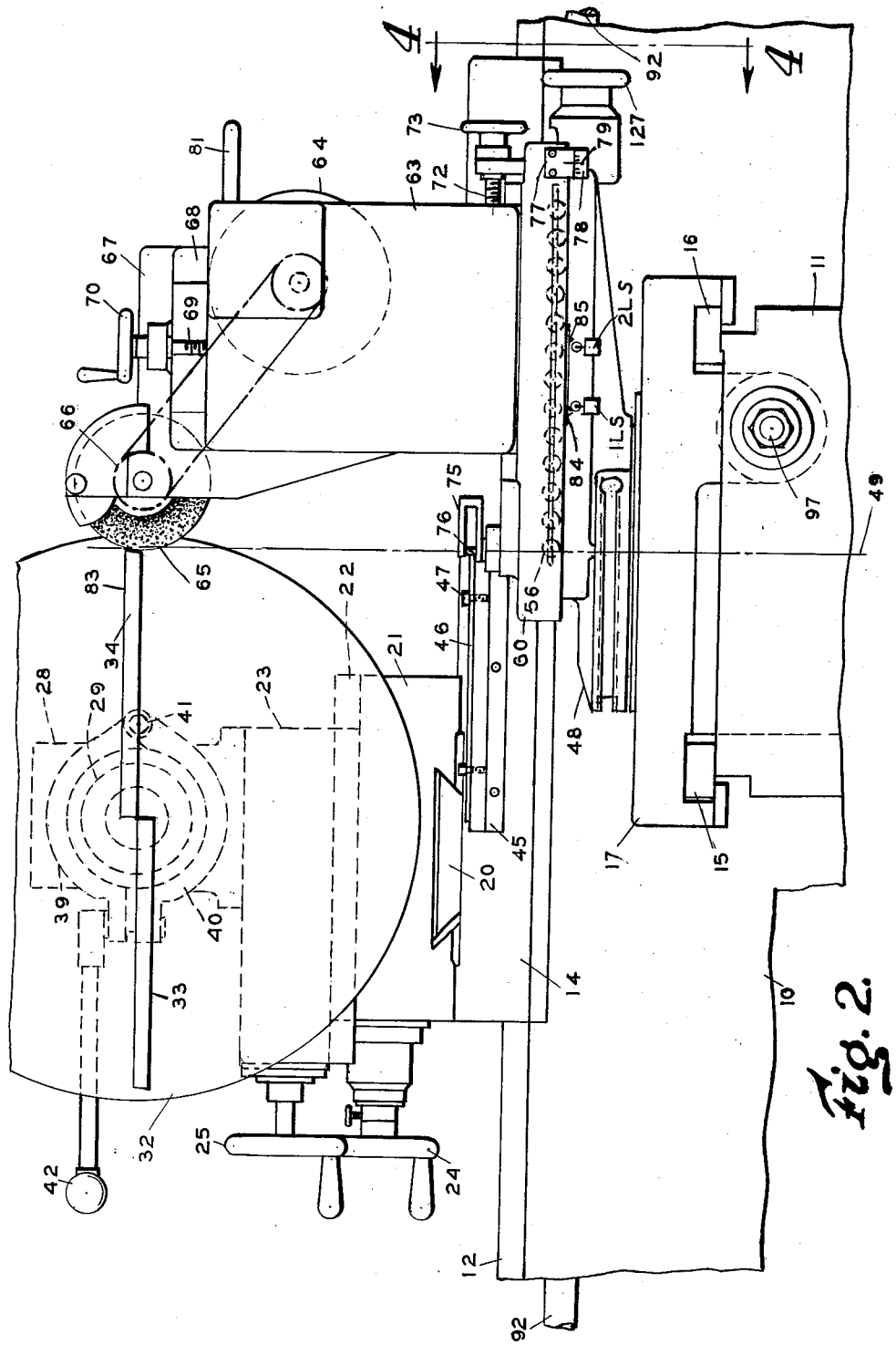
FIG. 2 is a front elevation of a portion of the machine shown in FIG. 1.

Means is also provided for clamping the spindle and holding it against rotation in positions intermediate those determined by the notches in the index plate, this means including a pair of clamping jaws 39 and 40 (FIG. 2). These jaws are supported for pivotal movement on a pin 41 secured to the index head 28. The free ends of the jaws are adapted to be drawn together by a clamping lever 42 so as to cause the jaws to engage the spindle and hold it against rotation.

Secured to the slide 14 beneath the face plate 32 on the workhead 28 is a template holder 45 to which a template 46 is secured by means of screws 47. It will thus be seen that the template is located beneath the cutter on the slide 14 and that it is possible by means of handwheels to adjust the workhead relative to the template so that cutter blade lies in direct vertical alignment with the template.

The cross slide 17 has mounted thereon a swivel support 48 which is journaled for rotation about an axis 49 by means of the construction shown in FIG. 3 of the drawings. As therein shown, a hollow shaft 50 is journaled in a well provided in the cross slide by means of roller bearings 51 and 52. At its upper end the shaft is provided with a flange 53 which is bolted to the under side of the swivel support 48 so as to mount the support for rotation on the cross slide.

Figure 4:
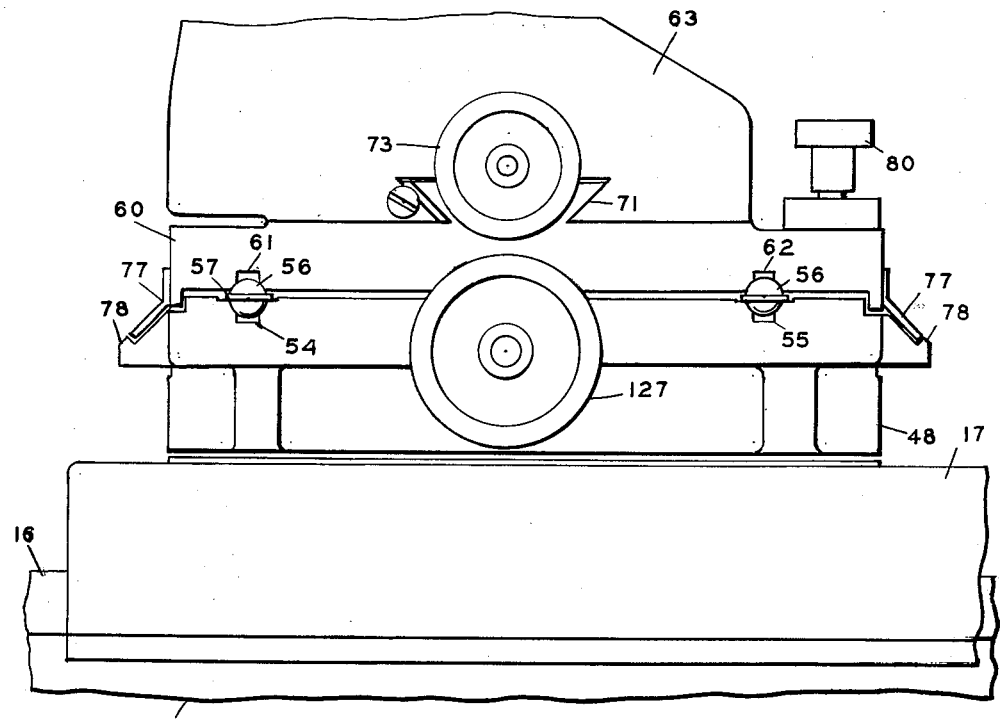
FIG. 4 is an end view taken along the line 4—4 in FIG. 2.

As best shown in FIG. 4, the swivel support is provided on its upper surface with a pair of ball tracks 54 and 55 for receiving balls 56 held in spaced apart relation by retainers 57. Mounted on the support 48 is a ball slide 60 which is provided on its under surface with ball tracks 61 and 62 for receiving the balls 56. Mounted on the ball slide is a toolhead 63 on which is mounted an electric motor 64 for driving a grinding wheel 65 by means of a belt 66. As seen best in FIG. 1, the grinding wheel and its driving motor are supported on a bracket 67 which is arranged by vertical adjustment on the toolhead 63 by a dovetail guide 68 and an adjusting screw 69 fitted with a handwheel 70. Provision is also made for horizontal adjustment of the toolhead 63 on the ball slide 60, this means including a dovetail guide 71 (FIG. 4) and an adjusting screw 72 (FIG. 2) fitted with a handwheel 73.

The ball slide also carries a follower 75 which is provided with an arcuate surface 76 for contact with the edge of the template 46. The position of the ball slide on the swivel support 48 is indicated by an index plate 77 on the ball slide which cooperates with a scale 78 on the swivel support 48. When the index line on the plate 77 lines up with a matching line 79 on the scale 78 the ball slide is in what may be termed a "normal" position relative to the support 48. For the convenience of the operator, an index plate 77 and scale 78 may be provided on both sides of the ball slide as indicated in FIG. 4. The ball slide may be locked in its normal position relative to the swivel support 48 by means of a locating pin 80 (FIG. 4) on the ball slide which is arranged to enter a locating hole in the support 48 when the slide is in its normal position. During a cutter sharpening operation, however, the pin 80 is raised so as to disengage it from the hole in the swivel support 48 and thereby permit the ball slide to move freely on the support.

When the ball slide is in its normal position, the center of curvature of the arcuate surface 76 on the follower 75 is arranged to lie on the axis 49 about which the support 48 swivels. The grinding wheel 65 is dressed, as shown in FIG. 1, to a radius corresponding to that of the arcuate portion 76 of the follower and the center of curvature of the grinding wheel is arranged to be aligned with the axis 49 by means of the handwheel 73 when the ball slide is in its normal position. Hence, the contact surface of the wheel will be in vertical alignment with the contact surface of the follower and the center of curvature of both will lie on the axis 49 when the ball slide is in its normal position. It will be understood, of course that the radius of curvature of the edge of the wheel and of the portion 76 of the follower may be made as large or as small as desired and may even be reduced to zero where a point contact is desired.

In the operation of the machine, the major axis of the grinding wheel 65 is maintained perpendicular to the contour of the cutter blade as the wheel is progressed along the edge of the blade. This is illustrated in FIG. 1 where the wheel is shown in two moved positions designated by reference numerals 65' and 65" and it will be noted that in each of the three positions of the wheel shown in FIG. 1 the plane of the wheel is kept perpendicular to the edge of the blade. This is effected by swiveling the tool head about the axis 49 by means of a handle 81 projecting outwardly from the head. This relationship must be maintained if the clearance angle of the cutter is to be kept uniform along the entire length of the blade. It will be understood that the clearance angle may be initially determined by vertical adjustment of the bracket 67 by hand wheel 70 (FIG. 2) so as to vary the position of the grinding wheel center with respect to the upper surface 83 of the blade. If the wheel is not maintained normal to the blade, this fact will be evidenced by movement of the ball slide 60 from its normal position on the support 48. The ball slide is provided with a pair of dogs 84 and 85 which cooperate with the plungers of limit switches 1LS and 2LS to cause operation of one or the other of these switches when movement of the ball slide from its normal position exceeds preestablished limits as determined by the sitting of the dogs. By means hereinafter to be described, the operation of either limit switch by a dog stops the movement of the slides 14 and 17 until the condition has been corrected.

Figure 5:
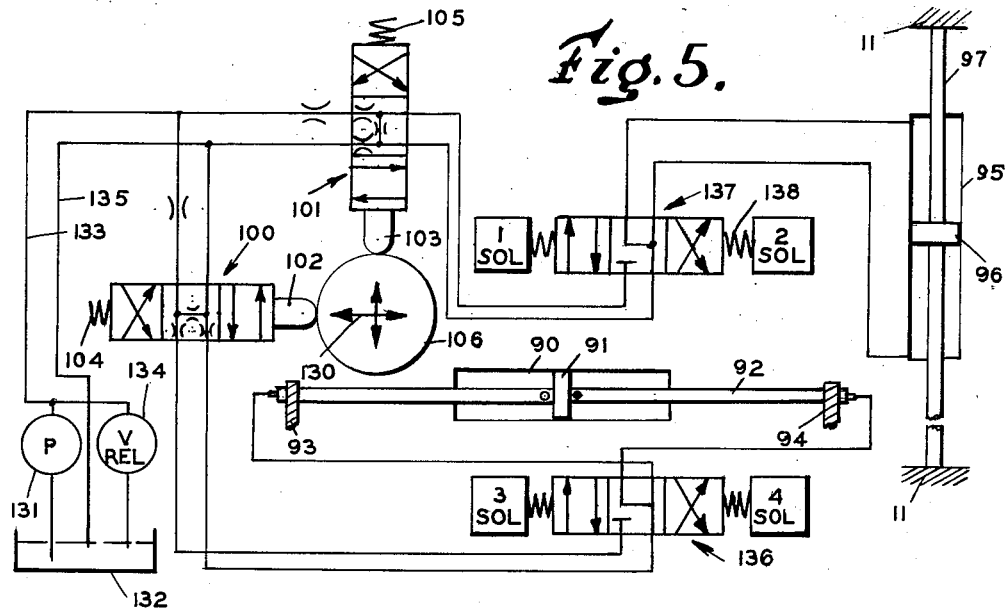
FIG. 5 is a diagrammatic view showing the hydraulic circuit of the contour cutter sharpening machine.

In accordance with the present invention, the longitudinal slide 14 and the cross slide 17 are each provided with a power drive means, these means being suitably controlled so as to always move the toolhead in a direction normal to the plane of the cutting tool. As shown in FIGS. 1, 2, and 5, the longitudinal slide has secured thereto a hydraulic cylinder 90 containing a piston 91 secured to a piston rod 92. The piston rod is secured at its ends to brackets 93 and 94 fastened to the bed 10 of the machine. The cross slide 17 has secured thereto a cylinder 95 containing a piston 96 attached to a piston rod 97 the ends of which are suitably secured to the bed. The flow of hydraulic fluid under pressure to the cylinders 90 and 95 is controlled by a pair of reversing throttle valves 100 and 101 containing plungers 102 and 103 which are urged by springs 104 and 105 into engagement with an eccentric cam 106. The eccentric cam may be constructed in accordance with the disclosure contained in U.S. Patent No. 2,332,533 granted October 26, 1943, on an application of E. G. Roehm for Tracer Mechanism. The eccentric cam is essentially comprised of a ring 107 (FIG. 3) which is supported by a pair of inclined cylinders 108 and 109. These cylinders are arranged for relative sliding movement so as to change the degree of eccentricity of the ring 107 with respect to an axis 110 about which the unit rotates. As shown in FIG. 3 this unit includes a hollow shaft 111 which is journaled at its upper end in a bushing 112 received in an opening in the cross slide 17, and at its lower end in a ball bearing 113 mounted in the cross slide. Fastened to the shaft 111 is a gear 114 which is arranged to be driven by a gear 115 secured to the swivel shaft 50 in a 1:1 ratio through an idler gear 116. A flanged ring 117 is secured to the upper face of the gear 114 and serves as a retainer for the outer cylinder 108. For this purpose the cylinder 108 is provided on its lower end with a flange which lies beneath the flange on the ring 117 so as to permit lateral displacement of the cylinder 108 but not axial movement thereof. The inner cylinder 109 on the other hand is free to slide on the shaft 111 and for this purpose is provided with a cross pin 118 which is received in elongated slots 119 provided in the shaft 111. The pin 118 also passes through a plunger 120 which is slidably received in the bore in the shaft and is connected by a lever 121 pivoted at 122 with a plunger 123 slidable within the hollow shaft 50. At its upper end, the plunger 123 is provided with a groove 124 which receives a roll 125 eccentrically mounted on the end of a shaft 126 journaled for rotation in the support 48. At its outer end, the shaft 126 has secured thereto a handwheel 127 which, when rotated, will raise or lower the plungers 123 and 120 to vary the eccentricity of the cam 106. As explained in Patent No. 2,332,533, when the inclined cylinder 109 is in the position shown in FIG. 3, the cam 106 is centralized with respect to the axis 110 as are also the valves 100 and 101. With the valves in this condition, the pressures in the opposite ends of the pistons in cylinders 90 and 95 are equal and the slides 14 and 17 will be held against movement. When, however, the handwheel 127 is rotated, the cylinder 109 will be elevated thereby introducing eccentricity into the cam and causing the valve plungers to be displaced from their centralized positions. The slides will then begin to move and the direction of movement will be in accordance with the orientation of the maximum radius of eccentricity of the cam as indicated by reference numeral 130 in FIG. 5. The rate of movement of the slides in this direction will correspond to the amount of eccentricity provided by the handwheel 127.

Referring now to the hydraulic diagram shown in FIG. 5 of the drawings, hydraulic fluid under pressure is delivered to the system by a pump 131 which withdraws fluid from a reservoir 132 and delivers it to a pressure supply line 133 at a pressure determined by the setting of a relief valve 134. Spent fluid is returned to the reservoir through a return line 135. As indicated in the diagram, the valves 100 and 101 act as reversing throttle valves and control the differential pressures in the ends of the cylinders 90 and 95 from 0, when the valves are centered, to a maximum in either direction when the valves are moved a maximum distance from their center positions. The valves are connected to their related cylinders through solenoid valves 136 and 137. When the solenoids are deenergized, these valves are moved to a neutral position by their centering springs 138. In this position of the valve, the ends of the cylinders are connected together thereby balancing the pressure in both ends of the cylinders. This will stop the slides and the machine will be at rest. Energization of one or the other of the solenoids for each valve will connect the ends of the cylinders to their related control valve 100 or 101 in either a forward or reverse direction depending upon whether an odd numbered or even numbered solenoid is energized. It is therefore possible by suitable energization of the solenoids to cause the follower 75 to trace right or trace left along the template 46.

This may be more fully understood by reference to the wiring diagram shown in FIG. 6. As shown in the drawing, the terminals at the top of the diagram are connected to a suitable source of electrical energy so as to energize the lines 142 and 143. It will be noted from the wiring diagram that the limit switches 1LS and 2LS are both in a released condition and that a selector switch 144 is positioned to cause both slides to move. Under these conditions when a Trace Right push-button 145 is depressed, a control relay 1CR (line 2) will be energized and close the holding contacts 1CR in line 3 to maintain the relay energized after the push button is released. Since the relay contacts 1CR in line 7 are immediately closed upon the depression of the push-button, a relay 3CR will also be energized through the limit switch contacts 1LS and 2LS in line 8. Relay 3CR will be held energized by the holding contacts 3CR in the line 8. Relay 3CR also has normally open contacts in lines 14 and 16 and, accordingly, solenoids 1SOL and 3SOL will be energized through the now closed 1CR contacts in the same lines. Accordingly, if the toolhead is positioned with the grinding wheel at the location indicated by reference numeral 65′ in FIG. 1, the cross slide will be moved inward and the longitudinal slide will be moved to the right thereby providing a result movement which is normal to the plane of the grinding wheel. As the slides move, the operator maintains the follower against the template and controls the swivel support to maintain the plane of the grinding wheel perpendicular to the contour of the cutter blade. As the swivel support is adjusted to maintain this condition of perpendicularity, the eccentric cam 106 will be rotated to thereby adjust the power operation of the slides to maintain the resultant direction of movement of the grinding wheel and follower tangential to the surface of the template and the cutter. Should the operator fail to maintain the plane of the tool 65 normal to the contour of the cutter, the ball slide 60 will move from its normal position to compensate for the error in the directional heading of the slides. If this error is sufficiently great, one or the other of the limit switches will be operated thereby breaking the circuit to relay 3CR and causing solenoids 1SOL and 3SOL to be deenergized to stop the power operation of the slides. Since the contacts of relay 1CR in line 10 are now closed, a circuit will be provided through one or the other of the limit switch contacts in lines 9 and 10 to relay 4CR which will be energized and close its holding contacts in line 11. The direction of tracing may now be reversed to correct for the overtravel of the ball slide by depressing the Trace Left push-button 146 which will drop out relay 1CR and energize relay 2CR thereby closing the contacts of this relay in lines 6 and 8. Accordingly, a circuit will be provided to relay 3CR through the closed contacts of the push-button in line 6 thereby energizing the relay and causing its contacts in lines 14 and 16 to be closed. Since the relay contacts 2CR in lines 15 and 17 are now closed, solenoids 2SOL and 4SOL will be energized and cause the cross slide to move outward and the longitudinal slide to move to the left. After the overtravel condition has been corrected and the ball slide returned to its normal position, tracing may be stopped by depressing the Trace Stop push-button 147 to drop out relay 2CR which will in turn break the circuit to relay 3CR and stop further tracing to the left. The operator may thereafter resume tracing to the right by depressing push-button 145 and thus continue the grinding pass to the end of the template where the Trace Left push-button 146 may be depressed to reverse the direction of the slide and cause a return pass to be effected. Alternatively, instead of depressing the Trace Stop push-button to stop further tracing, the operator could have depressed the Trace Right push-button directly thereby dropping out relay 2CR and picking up relay 1CR to reverse the direction of tracing without stopping the operation. When the tool has reached the position indicated by reference numeral 65″ in FIG. 1, the Trace Right push-button 145 may be depressed to reverse direction of movement of the slides and cause tracing to the right to effect a further pass of the tool along the cutter blade.

Inasmuch as both blades 33 and 34 of the cutter are of the same contour, the template 46 need only be provided with one-half the contour of the entire cutter. Thus, after the blade 34 has been sharpened, the workhead may be indexed 180° to move the blade 33 into position for sharpening.

The selector switch 144 is also provided with a longitudinal position and a cross position whereby only the longitudinal slide 14 or the cross slide 17, respectively, will be operated upon depression of the trace right or trace left push-buttons. This permits a jogging type operation of the slides to be effected in order to move the grinding wheel to a truing position or for such other purposes as may be found necessary or desirable.

It will be apparent from the foregoing description that the new design of contour tracing apparatus is eminently suited for use in situations where a very accurate reproduction of the template outline is required. It is also, of course, admirably suited for use in those cases where the tool must at all times be maintained perpendicular to the workpiece, as in the apparatus heretofore described. It will further be noted that since the toolhead is on its own ball slide, cross-over of the slides 14 and 17, as determined by the valves 100 and 101, is not critical. In other words, any error in the movements of the slides around their reversal points will not be imparted to the tool by virtue of its independent mounting on the ball slide. Similarly, the slides need not move at exactly the correct speeds to produce a directional heading corresponding to the angular position of the swivel support in order to produce accurate reproductions of the template in the workpiece. That is, when the wheelhead is set at an angle of 45 degrees, the two slides need not move at exactly the same speeds since the ball slide can move slightly to compensate for this error.

What is claimed is:

1. A machine for tracing the outline of a template comprising a pair of transversely movable slides for effecting universal movement between a pair of supports carried by said slides, means to mount the template on one of said supports, a follower, means to mount said follower on the other of said supports, means to swivel said other support for rotation about an axis passing through the follower, power means for driving said slides to effect relative movement between the follower and template, and means operated in accordance with the rotation of said swivel support about said axis to control the rate and direction of movement of said slides by said power means to cause the follower to be moved by power along the template.

2. A machine for reproducing in a workpiece the outline of a template comprising a pair of transversely movable slides for effecting universal movement between a pair of supports carried by said slides, means to mount the workpiece and template in superposed relation on one of said supports, a tool having an arcuate profile on its work-engaging portion, a follower having an arcuate profile corresponding to that of said tool on its template-engaging portion, means to mount said tool and follower in superposed relation on the other of said supports, means to swivel said other support for rotation about an axis passing through the center of curvature of the arcuate profile on the follower and on the tool, power means for driving said slides to effect relative movement between the tool and workpiece and between the follower and template, and means operated in accordance with the rotation of said swivel support about said axis to control the rate and direction of movement of said slides by said power means to cause the follower to be moved by power along the template.

3. A machine for tracing the outline of a template comprising a pair of transversely movable slides for effecting universal movement between a pair of supports carried by said slides, means to mount the template on one of said supports, a follower having an arcuate profile on its template-engaging portion, means to mount said follower on the other of said supports including a compensating slide guided for movement on said other support in one direction or the other from a normal position thereon, means to swivel said other support for rotation about an axis passing through the center of curvature of the arcuate profile on the follower when said compensating slide is in its normal position, power means for driving said slides to effect relative movement between the follower and the template, and means operated in accordance with the rotation of said swivel support about said axis to control the rate and direction of movement of said slides by said power means to cause the follower to be moved by power along the template.

4. The machine of claim 3 including antifriction bearing ways for supporting and guiding said compensating slide on said swivel support.

5. The machine of claim 3 including means to disable said power means upon movement of said compensating slide on said swivel support beyond preselected limits on either side of said normal position.

6. The machine of claim 5 including means on said compensating slide for indicating the normal position of the slide on said swivel support, and a handle on said swivel support for moving the same about said axis to maintain said compensating slide in its normal position on said swivel support as signified by said indicating means.

7. A machine for reproducing in a workpiece the outline of a template comprising a pair of transversely movable slides for effecting universal movement between a pair of supports carried by said slides, means to mount the workpiece and template in superposed relation on one of said supports, a tool having an arcuate profile on its work-engaging portion, a follower having an arcuate profile corresponding to that of said tool on its template-engaging portion, means to mount said tool and follower in superposed relation on the other of said supports including a compensating slide guided for movement on said other support in one direction or the other from a normal position thereon, means to swivel said other support for rotation about an axis passing through the center of curvature of the arcuate profile on the follower and on the tool when said auxiliary slide is in its normal position, separate fluid operable means for driving said slides to effect relative movement between the tool and workpiece and between the follower and template, adjustable throttle valves effective to control the rate and direction of operation of said fluid operable means, and means operated by the rotation of said swivel support about said axis to effect coordinated adjustment of said valves whereby relative movement will be produced between the follower and template in a direction corresponding to the rotary position of said swivel support.

8. The machine of claim 7 wherein said last-recited means includes an eccentric cam for operating the valves, and a driving connection between said swivel support and said cam.

9. The machine of claim 8 including means to vary the amount of eccentricity of said cam whereby the rate of movement of the follower along the template may be controlled accordingly.

10. A machine for reproducing in a workpiece the outline of a template comprising ap air of transversely movable slides for effecting universal movement between a pair of supports carried by said slides, means to mount the workpiece and template in superposed relation on one of said supports, a rotary tool having an arcuate profile on its work-engaging portion, a follower having an arcuate profile corresponding to that of said tool on its template-engaging portion, means to mount said tool and follower on the other of said supports including a ball-slide guided for movement on said other support in one direction or the other from a normal position thereon, means to swivel said other support about an axis perpendicular to the plane of its associated slide, said axis passing through the center of curvature of the arcuate profile on the tool and on the template when said ball-slide is in its normal position, power means for driving said slides to effect relative movement between the tool and workpiece and between the follower and template, and means operated in accordance with the rotation of said swivel support about said axis to control the rate and direction of movement of said slides by said power means to cause the follower to be moved by power along the template.

UNITED STATES PATENTS

References Cited in the file of this patent

| | | |
|---|---|---|
| 2,332,533 | Roehm | Oct. 26, 1943 |
| 2,419,529 | Braaten | Apr. 29, 1947 |